United States Patent [19]

Post

[11] Patent Number: 4,626,750
[45] Date of Patent: Dec. 2, 1986

[54] SOLID STATE D.C. MOTOR CONTROL

[75] Inventor: Stephen F. Post, Pleasant Hill, Calif.

[73] Assignee: Curtis Instruments, Inc., Mt. Kisco, N.Y.

[21] Appl. No.: 774,265

[22] Filed: Sep. 10, 1985

[51] Int. Cl.<sup>4</sup> .............................................. H02P 5/17
[52] U.S. Cl. .................................... 318/139; 318/259;
318/262; 318/263; 318/269; 318/270
[58] Field of Search ............... 318/139, 255, 256, 257,
318/258, 259, 260, 261, 262, 263, 268, 269, 270,
271, 345 B, 345 F

[56] References Cited

U.S. PATENT DOCUMENTS

| | | | |
|---|---|---|---|
| 3,188,545 | 6/1965 | Sheheen | 318/258 X |
| 3,213,343 | 10/1965 | Sheheen | 318/258 X |
| 3,349,309 | 10/1967 | Dannettell | 318/139 X |
| 3,855,520 | 12/1974 | Stich | 318/139 X |
| 4,211,961 | 7/1980 | Marumoto et al. | 318/139 |
| 4,292,573 | 9/1981 | Ebert et al. | 318/257 X |

Primary Examiner—William M. Shoop, Jr.
Assistant Examiner—Bentsu Ro
Attorney, Agent, or Firm—Curtis Ailes

[57] ABSTRACT

The system includes a plurality of parallel-connected power field effect transistors arranged for connection in series with the traction motor with a common control circuit connected to the gate electrodes of the field effect transistors to control the on-off cycle of conduction through the field effect transistors. A plurality of parallel connected power diodes are arranged for reverse connection in parallel with the traction motor to serve as freewheeling diodes. The diodes are physically positioned apart from one another and distributed in position among the field effect transistors and each diode is positioned in a similar manner with a group of associated field effect transistors for ease of transfer of current flow between the diode and the associated field effect transistors.

18 Claims, 6 Drawing Figures

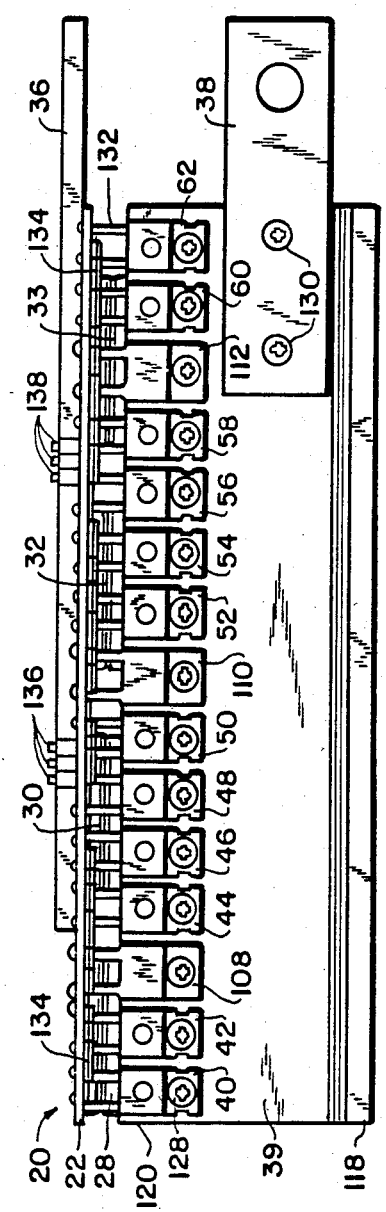
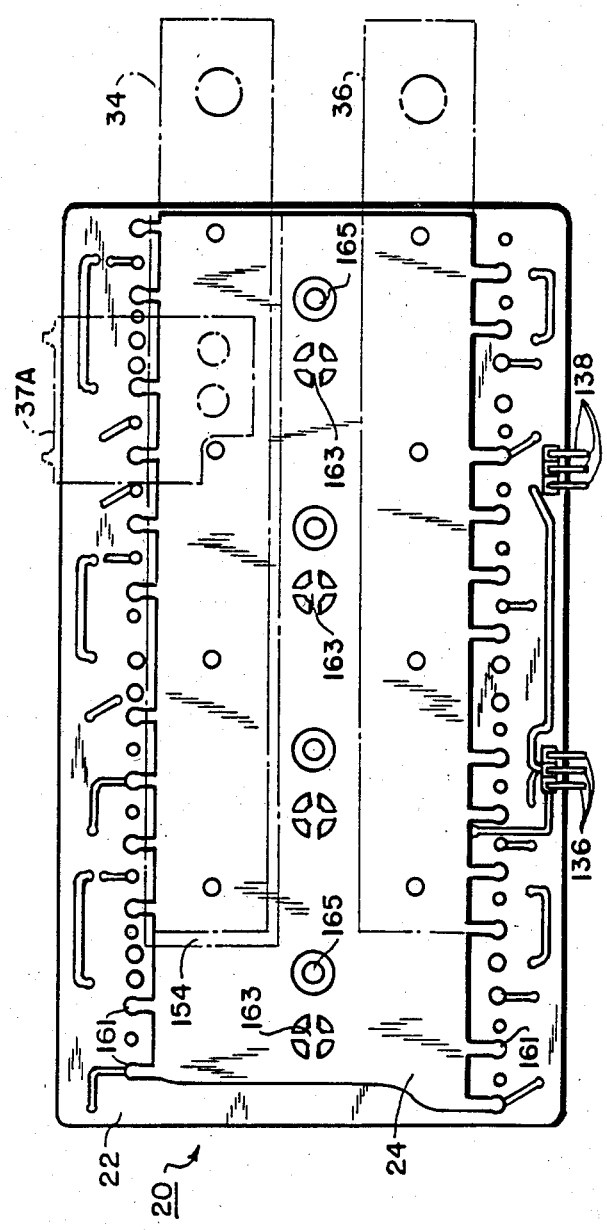
FIG.2
FIG.4

4,626,750

SOLID STATE D.C. MOTOR CONTROL

This invention relates to d.c. motor control systems which are particularly useful for controlling the speed of traction motors for battery powered vehicles.

BACKGROUND OF THE INVENTION

Recent control systems for battery powered d.c. traction motors have frequently employed silicon controlled rectifiers (SCRs) as "current chopper" control devices to provide a periodic on-off control to vary the current to the drive motor, and the resultant speed, by variation of the total average duration of "on" intervals. In this manner, the so-called duty cycle is adjusted. The SCR controls have been very satisfactory in many ways. However, they do have various problems including substantial cost, substantial energy losses, and substantial size and weight.

A promising recent entry in the solid state switching field is the power field effect transistor such as the MOSFET. The MOSFETs are metal-oxide-semiconductor field effect transistors which enjoy the advantages of very high (nearly infinite) input impedence, very fast switching times, a positive temperature coefficient of resistance, and especially low cost. The positive temperature coefficient of resistance is very advantageous for paralleling of multiple MOSFETs because it provides a degree of automatic load sharing.

MOSFETs are designed for different voltage ratings. The higher the voltage rating, the higher the internal resistance of the MOSFET and the lower the current which can be safely handled by the MOSFET at a safe rate of power dissipation. Accordingly, it is desirable to try to employ MOSFETs which have the lowest possible voltage rating, for both economy and for avoidance of unnecessary power dissipation.

Unfortunately, the MOSFETs must not only handle the operating voltage, but also any transient voltage spikes which arise from switching of the MOSFETs. These transient voltages arise especially when the MOSFETs are switched off. This means that the voltage rating of the MOSFETs must be somewhat higher than the maximum voltage of the power source. It also means that measures are preferably taken to limit the transient voltage spikes during switching operations.

Another disadvantage of prior controllers has been that the commutation frequency has typically been in the audible range, sometimes at 2,000 hertz, for instance. This leads to a substantial audible tone during operation of the system.

It has been found to be much more satisfactory to set the commutation frequency at a higher level such as 15,000 hertz, which is above the upper frequency threshold of hearing for many humans. Also, when the frequency is raised to that level, the amplitude of the sound is substantially attenuated so that even for those who can actually hear it, the sound is not a serious problem. However, when the operating frequency is raised as high as 15,000 hertz, the commutating speed for the MOSFETs must generally be higher, leading to higher transient voltage spikes.

Another problem is that it is often desired to operate vehicles which are to be controlled with a battery supply voltage which is at a nominal 36 volt level, rather than a level lower than 36 volts. This also raises the voltage which must be dealt with by the MOSFETs. Furthermore, with a vehicle of some size, such as a baggage carrying vehicle, or a golf cart, the motor current may be at a substantial level, as high as 400 amperes.

Accordingly, it is an object of the present invention to provide an improved solid state d.c. motor control which safely employs power MOSFETs having a relatively low voltage rating as the switching elements and which is extremely durable and inexpensive and compact and which is capable of operation at frequencies in the order of 15,000 hertz.

It is another object of the invention to provide an improved solid state d.c. motor control which incorporates fail-safe features which prevent undue strain on the drive motor and the battery and the control system itself.

One problem in the design of variable speed d.c. motor controls is that operators of battery powered vehicles often employ a procedure of reversing the motor connections in order to stop the vehicle rapidly. This is referred to as "plug" braking.

When plug braking is employed, the motor field is typically reversed in its connections and the strength of the field must be substantially reduced immediately in order to avoid excessive braking, leading to skidding, undue strain on the equipment, and lack of control. In order to substantially reduce the field current, the operation of the commutating MOSFETs must be reduced to a very low duty cycle. Unfortunately, it is virtually impossible to switch the MOSFETs off rapidly enough to reduce the duty cycle sufficiently for reasonable plug braking at an operating frequency of 15,000 hertz without causing excessive transient voltage spikes.

Accordingly, it is another object of the present invention to solve the above-mentioned problem by providing circuitry which detects when plug braking is called for by the operator and for changing the mode of operation of the control system to achieve the desired plug braking field current.

Further objects and advantages of the invention will be apparent from the following description and the accompanying drawings.

SUMMARY OF THE INVENTION

In carrying out the invention there is provided an electronic circuit chopper control system for a d.c. traction motor comprising a plurality of parallel-connected power field effect transistors arranged for connection in series with the traction motor, a common control circuit connected to the gate electrodes of said field effect transistors to control the on-off cycle of conduction through said field effect transistors, a plurality of parallel connected power diodes arranged for reverse connection in parallel with the traction motor to serve as freewheeling diodes, said diodes being physically positioned apart from one another and distributed in position among said field effect transistors and each diode being positioned in a similar manner with a group of associated field effect transistors for ease of transfer of current flow between the diode and the associated field effect transistors.

BRIEF DESCRIPTION OF THE DRAWINGS

FIG. 2 is a mechanical side view of a preferred embodiment of the invention.

3

Figure 3:
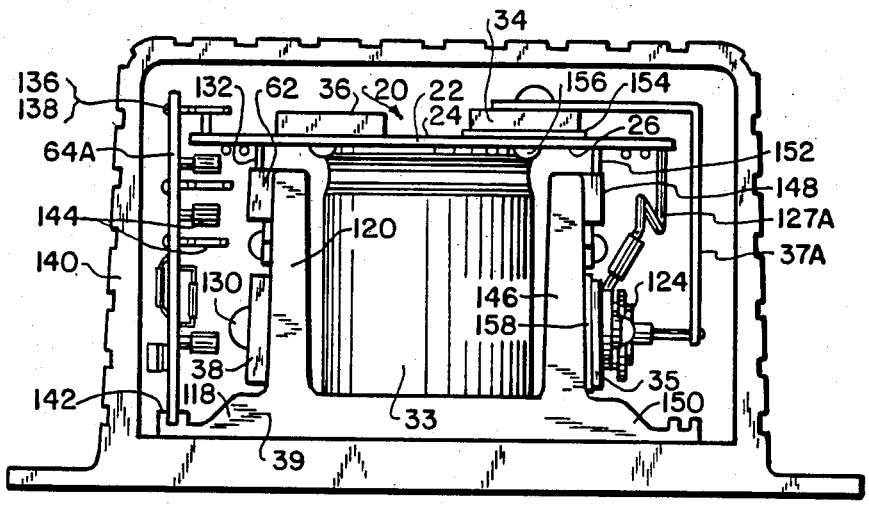

FIG. 3 is an end view of a preferred embodiment of the invention showing the preferred configuration of the housing surrounding the controller and the arrangement of the control circuit on a separate printed circuit card.

Figure 1:
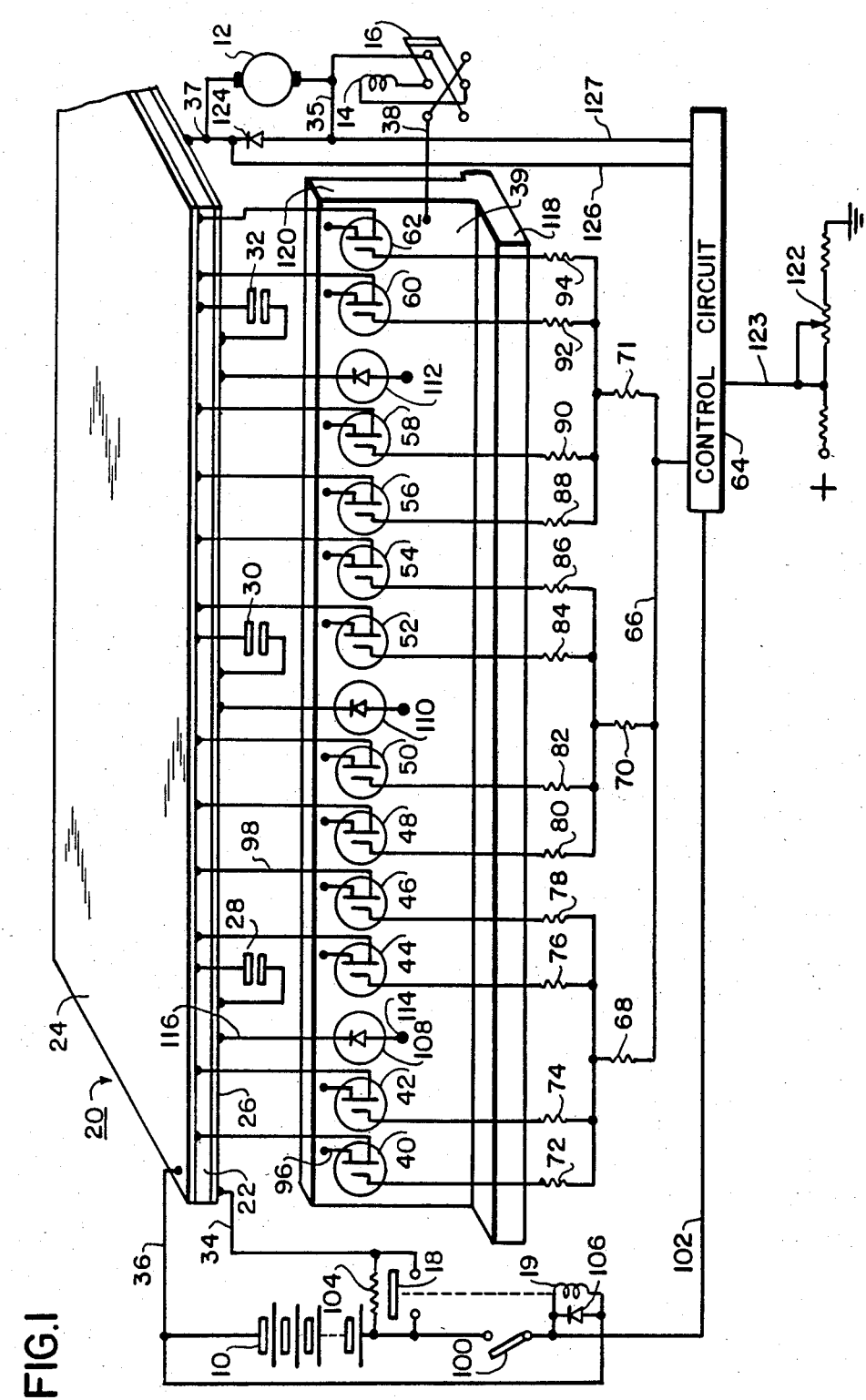
FIG. 1 is a schematic circuit diagram representation of a preferred embodiment of the invention with certain critical parts illustrated in physical perspective.

FIG. 4 is a top view of the printed circuit card 20 of FIG. 1 and showing added mechanical details.

Figure 5:
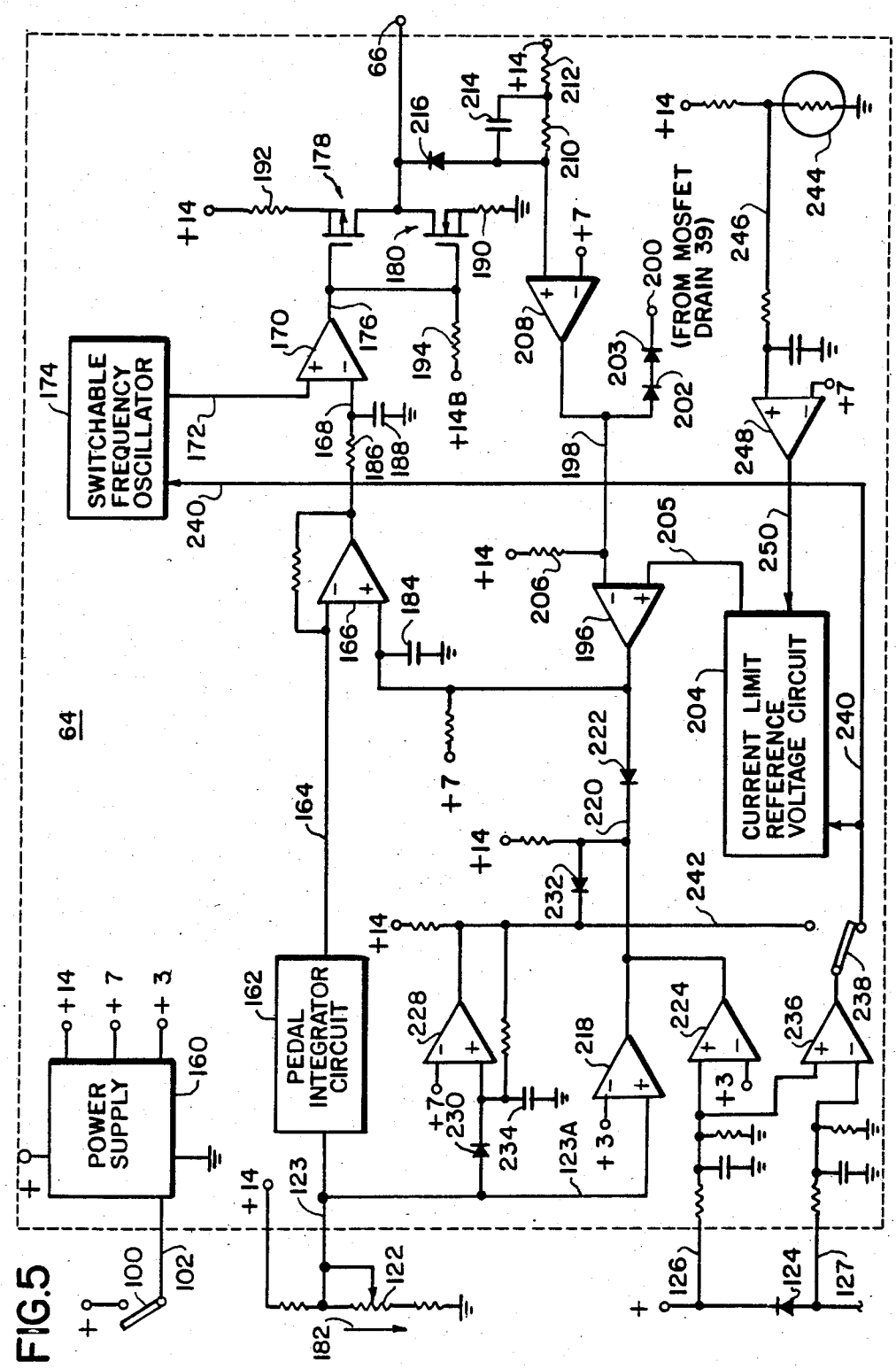

FIG. 5 is a simplified schematic circuit diagram of the control circuit 64 of FIG. 1.

Figure 6:
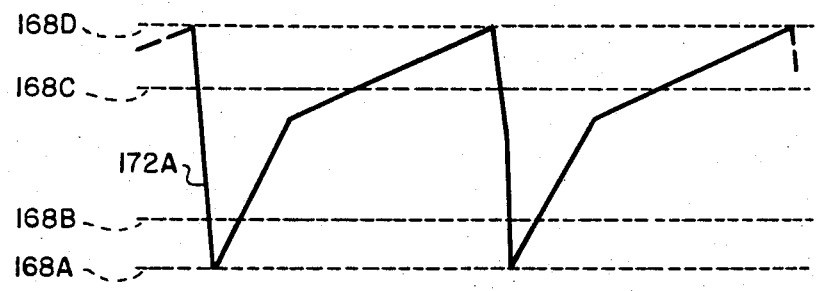

FIG. 6 is a voltage plot illustrating the principles of the operation of a portion of the control circuit of FIG. 5.

DESCRIPTION OF THE PREFERRED EMBODIMENTS

Referring particularly to FIG. 1, the control system is illustrated for controlling the supply of power from a battery 10 shown at the left of the drawing to a traction motor 12 shown at the right of the drawing. The motor 12 includes a series field winding 14 with a reversing switch control 16 for reversing the field winding in order to reverse the direction of the torque of the motor 12.

An on-off contactor 18 actuated by a contactor winding 19 is provided for connecting the battery 10 to the control system. The control system preferably includes a printed circuit board 20 having a dielectric body 22 and an upper plate electrode 24, and a lower plate electrode 26. The plate electrodes 24 and 26 may be a part of the printed circuitry upon the printed circuit board 20. The plate electrodes serve as main conductor buses for conducting power from the battery 10 to the motor 12.

The plate electrodes 24 and 26 are also sometimes characterized below as constituting a part of a capacitor structure. The capacitor structure also includes a plurality of distributed electrolytic capacitors 28, 30, and 32 which are connected across the two plate electrodes 24 and 26. Since the plate electrodes 24 and 26 are separated by a dielectric board 22, those electrodes obviously form a capacitor. While the capacitance formed by the two electrodes 24 and 26 is much smaller than the capacitance provided by the capacitors 28, 30, and 32, since all of these elements, the plates 24 and 26 plus the capacitors 28, 30, and 32 provide capacitance to the combined structure, it is appropriate to refer to them collectively as a capacitance structure.

The substantial capacitance of the capacitance structure provides for power filtering of the load on the battery 10. The capacitance of the capacitance structure is so substantial, and its resistance and inductance so low, that the load appears to the battery 10 as a substantially constant load. This not only improves battery life, but essentially eliminates the series resistance and inductance of the battery and the battery leads as a factor in contributing to transient voltage spikes during current switching.

Another way in which this principle can be expressed is that the total capacitance of the capacitance structure is sufficient to handle a total ripple current corresponding to a substantial fraction of the average current flow through the system at the operating frequency of the system with a negligible change in capacitor voltage. Thus, the capacitance structure, in combination with the d.c. power source, provides an apparent d.c. power source having a negligible series impedance.

The positive terminal of battery 10 is connected through contactor 18 and connection 34 to the bottom plate electrode 26 of circuit board 20. The negative terminal of battery 10 is connected at 36 to the upper plate electrode 24 of the board 20. The bottom plate electrode 26 is connected at 37 to the armature of the motor 12. In a preferred physical embodiment, the connections 37 and 34 are actually common so that current flow through plate electrode 26 is minimized.

The armature circuit is continued through reversing switch 16, and the series field 14, and connection 38 to a combined connection bus and thermal heat sink 39. The circuit from the bus and heat sink 39 is completed to the top plate electrode 24 through a group of parallel connected MOSFETs 40, 42, 44, 46, 48, 50, 52, 54, 56, 58, 60, and 62, which will hereinafter be referred to collectively as MOSFETs 40-62.

The MOSFETs 40-62 are all switched on and off by switching signals received on their gate electrodes from a control circuit 64 through a connection network including connection 66, resistors 68, 70, and 71, and isolation resistors 72-94. The resistance value of each resistor 72-94 may be typically 150 ohms. The resistors 68, 70, and 71 may be one ohm or less. The drain of each MOSFET 40-62 is electrically connected to the bus heat sink 39 as illustrated at 96 for MOSFET 40. The source electrode of each MOSFET 40-62 is connected to the upper plate electrode 24 as illustrated at 98 for MOSFET 46.

The system is switched on by a switch 100, illustrated at the left margin of the drawing, which is preferably a key-actuated switch, and will be referred to hereinafter as the key switch. The key switch 100 provides power from the battery 10 to the contactor winding 19 to energize the system. Also, through a connection 102, the key switch 100 actuates the control circuit 64 to enable operation of the system.

A reverse-connected diode 106 is preferably connected in shunt with the contactor winding 19 in order to short the transient voltages which arise otherwise when current is interrupted through the contactor winding 19 as the system is shut down.

In order to avoid the problem of a substantial inrush of current to the capacitor structure including capacitors 28, 30, 32 upon initial startup of the system as contactor 18 is closed, a resistor 104 is preferably provided in shunt with contactor 18 for the purpose of charging up the capacitor structure gradually as soon as battery 10 is initially connected to the system, and before contactor 18 is closed.

Mounted and connected in a distributed fashion among the MOSFETs 40-62 are three parallel connected diodes 108, 110, and 112. These diodes are reverse connected in parallel with the armature 12 and field winding 14 of the drive motor to serve as so-called "free-wheeling" diodes. Because of the tendency of an inductive load such as a motor to resist the decay of current upon commutation of that current, the diodes provide a reverse connected short circuit for the armature current as the current paths through the MOSFET devices are switched off. This substantially decreases the voltages which would otherwise be encountered because of motor inductance. As shown in the drawing, each diode is electrically connected to the heat sink bus 39 and connected to the lower plate electrode 26. These connections are illustrated for diode 108 at 114 and 116.

As illustrated in the drawing, each diode is grouped with four MOSFETs. Thus, diode 108 is grouped with MOSFETs 40-46, diode 110 is grouped with MOSFETS 48-54, and diode 112 is grouped with MOSFETs 56-62. This physical distribution of the diodes and the MOSFETs along the heat sink bus 39 and along the plate 10 electrodes 24 and 26 provides for a transfer of current between the MOSFETs and the associated diodes, particularly as the MOSFETs are switched off. This means that there need not be any appreciable current flows, or changes in current flows, transversely across the heat sink bus 39 as the current is shifted between the MOSFETs and the diodes. This principle is believed to be very important in avoiding transient voltages in the system.

The physically distributed arrangement of the diodes and the power MOSFETs and the capacitor structure including plate electrodes 24, 26 and capacitors 28, 30, and 32 is one of the most important features of the present invention. This distributed arrangement not only minimizes current flows and changes in current flows transversely through the heat sink bus 39, but it also minimizes current flows and changes in current flows transversely through the plate electrodes 24 and 26. The arrangement of physically distributed parallel connected diodes is unusual, and the success of that arrangement is unexpected. Conventional thought in the industry is that there would be a tendency for current to shift from one diode to another, overloading one or more of the diodes as others are switched off as the MOSFETs are switched on. However, it has been found that this does not occur, and that the small distributed diodes are not individually overloaded. The use of small, low current rated, diodes in parallel is also very advantageous over the use of a large single diode because the small diodes are capable of switching much faster than a large diode. For instance, the small diodes in a preferred embodiment have a reverse voltage recovery rating time of 200 nanoseconds, while a single large diode to replace the distributed diodes would typically have a reverse voltage recovery rating of one microsecond. It is desired to turn on the MOSFETs (and turn off the diodes) in as little as 300 nanoseconds.

While not illustrated in this particular drawing, the MOSFETs 40-62 and the diodes 108-112 are each enclosed within a mechanical housing and one of the load conducting terminals of each of these devices is electrically connected to that housing. Thus, the drain electrode indicated at 96 for MOSFET 40 is connected to the housing of that MOSFET, and the anode terminal 114 of diode 108 is connected to the housing of that diode. An electrical and mechanical connection to the heat sink bus 39 is accomplished by securely fastening the housing of each of these devices to the heat sink bus 39. That fastening may be accomplished by a screw threaded fastener or clamp or rivet for each device. That fastening therefore provides a mechanical thermally conductive connection as well as an electrical connection to the heat sink bus 39.

The connections of the MOSFETs and the diodes to the plate electrodes 24 and 26, as indicated at 98 and 116, are illustrated in a schematic form in the present drawing. In the actual preferred physical embodiment, the edges of the plate electrodes 24 and 26 do not come all the way to the edge of the dielectric circuit card 22, but there are short printed extensions from the edges of the plate electrodes 24 and 26 which extend out from each of these plate electrodes to near the edge of the card 20, and to which the connections are made to the electrodes of the MOSFETs and the diodes. This is illustrated more fully below in FIG. 4. In the preferred embodiment, the gating circuitry, including the resistors 68-92, is also arranged around the periphery of the plate electrodes 24 and 26 on the printed circuit board 20.

Each of the capacitors 28, 30, 32 is preferably especially constructed to provide a very low inherent internal resistance (effective series resistance) and a very low inherent internal inductance (effective series inductance). The effective internal series resistance may be only 18 milliohms. Each capacitor may have a capacity rating in the order of 5,500 microfarads.

The heat sink bus 39 may be referred to below as a "common heat sink support structure". The heat sink bus 39 is preferably composed of a metal which is highly heat conductive, such as aluminum, and it preferably includes a base plate 118, having at least two upwardly extending rails terminating in upper edges. Only one upwardly extending rail 120 is illustrated in FIG. 1 in order to simplify that figure. However, in one preferred physical embodiment, a second rail is provided, and the second rail includes a complete additional set of 15 MOSFETs 40-62 and diodes 108-112 which are electrically connected in parallel respectively with the MOSFETs and diodes illustrated in FIG. 1. The MOSFETs and diodes on the second rail are again arranged in sets, with the diodes distributed in position among the MOSFETs for ease of current transfer.

The housings of the MOSFETs and diodes are preferably attached to the rails of the heat sink bus 39 near the upper rail edge in order to minimize the length of the conductors from these devices to the printed circuit board 20. These physical dimensions are more clearly illustrated and will be more fully understood from drawing FIGS. 2 and 3.

The speed of the motor is manually controllable by adjustment of a rheostat 122. The speed control rheostat 122 is preferably controlled by a foot pedal so that the action generally corresponds to that of an automobile accelerator pedal. Thus, rheostat 122 will be commonly referred to below as a pedal speed control rheostat. The pedal speed control rheostat 122 is connected at 123 to provide input signals to the control circuit 64.

In order to prevent destruction of the controller when so-called plug braking is occurring because of reversal of the motor field winding 14 by the field reversal switch 16, a diode 124 is reverse connected to shunt with the armature 12 of the drive motor to take current away from the free wheeling diodes 108-112. The voltage across that diode 124 is detectable through connections 126 and 127 to the control circuit 64. When plug braking begins, the voltage across diode 124 reverses polarity.

FIG. 2 is a mechanical side view of the embodiment of the apparatus illustrated in FIG. 1 and providing a clear representation of the mechanical relationships and the mechanical connections in a preferred embodiment of the invention.

The power MOSFETs 40-62 and the diodes 108, 110, 112 are all illustrated in the same relative positions in FIG. 2 as in FIG. 1. However, as shown in FIG. 2, each of these devices is in a housing, and the housings are each securely fastened mechanically and electrically to the rail 120 of the heat sink bus 39 by means of screws, as indicated at 128. Threaded holes are provided in the rail 120 to receive these screws 128. It is by virtue of these mechanical and electrical connections to the rail 120 and the heat sink 39 that the heat generated within these devices is transferred to the heat sink.

The capacitors 28, 30, and 32 of FIG. 1 are supported upon the printed circuit board 20 in a position behind the rail 120, as shown more clearly in the end view of FIG. 3, which is discussed more fully below. In the preferred embodiment, there is actually a fourth capacitor 33, in addition to the capacitors 28, 30, and 32. That fourth capacitor 33 is illustrated in FIG. 2 and in FIG. 3.

In FIG. 2, the connection 38 of FIG. 1 from the motor 12 is shown to be a heavy electrical connector which is securely attached to the heat sink bus 39 by means of threaded fastenings 130. Similarly, the negative battery connection 36 of FIG. 1 is shown in FIG. 2 to consist of a heavy connector bar which is mechanically and electrically in contact with the upper electrode plate 24 over a considerable area of that plate, being held in place by screws which are not shown in FIG. 2, but which extend through the printed circuit board 20, and are suitably insulated from the plate electrode 26. The plate electrodes 24 and 26 of FIG. 1 are so thin that they are not separately visible in the edge view of the printed circuit board 20 in FIG. 2.

As indicated at 132 in FIG. 2, all of the gate connections and source connections for the power MOSFETs 40–62 are carried up to the printed circuit board 20. The gate circuitry for the gates of the power MOSFETs is therefore contained primarily in the peripheral edges of the printed circuit board 20 and the isolating resistors 68–94 for those gate circuits are attached, and connected, as indicated generally at 134, to the underside of the printed circuit board 20.

Electrical connection prongs, six in number, are provided, as indicated at 136 and 138 at the top of the printed circuit board 30 for connection to a second printed circuit board which contains the circuitry for the control circuit 64 of FIG. 1. That control circuit board is not illustrated in FIG. 2.

FIG. 3 is a mechanical end view showing the left end of the structure as illustrated in FIG. 2, but illustrating the complete assembly of a preferred embodiment of the invention, including a outer housing 140, and a control circuit card 64A. The control circuit card is supported within a groove at the edge of flange 118, as indicated at 142. The upper end of the control card is electrically and physically attached to the printed circuit card 20 by means of the connection prongs 136 and 138 which extend through the card and are soldered in place in the circuit card 64A. Circuit components of the control circuit card are, for the most part, mounted on the right side of the card, as indicated at 144.

As shown in FIG. 3, the heat sink bus 39 preferably includes a second vertically extending rail 146 which supports a complete duplicate set of power MOSFETs and diodes, as indicated at 148. Also, another flange 150 is provided so that the right side of the heat sink bus 39 is substantially symmetrical with the left side. Also as shown in FIG. 3, the capacitors, such as capacitor 33, fit neatly into the space between the rails 120 and 146.

As illustrated especially in FIG. 3, the electrical circuit leads from the power MOSFETs and the diodes to the printed circuit board 20 are quite short. This is illustrated at 132 and at 152 in FIG. 3. The short leads are very important in keeping inductances and induced voltages low. These electrical leads from the power MOSFETs and the diodes are the chief means by which the circuit board 20 is attached to, and supported upon, the heat sink bus 39. The heat sink bus 39 thus serves as the mainframe of the apparatus. The bottom plate of the heat sink bus 39, including the flanges 118 and 150, is preferably attached by means of screw threaded fastenings to the bottom of the housings 140, and the housing 140 is then attached to the equipment which is served by the control system.

Battery power is carried to the plate electrode 26 on the underside of the printed circuit card by means of a bus connector 34 which is attached to the upper side of the card 20, but insulated from plate 24 by an insulator 154. An electrical connection is carried through to the plate electrode 26 by means of conductive screws 156 attached at the underside of the card 20.

An interconnection bus 37A is connected from the connector 34 to the reverse torque detection diode 124 which is mounted to the rail 146 through a connector bar 35, but insulated from the rail by means of an insulator 158. A connection wire 127A from connector bar 35 carries the plug braking (reverse motor torque) signal to the circuit card 20, and thus ultimately to the control circuit 64.

FIG. 4 is a top view of the circuit card 20 which shows the general organization of the card. Some of the other components which were shown and described in connection with FIGS. 2 and 3 are shown in phantom in FIG. 4 in order to indicate the relationship of those components to the card 20.

As shown in FIG. 4, the upper plate electrode 24 of the card 20 does not extend all the way to the side edges of the card. As indicated at 161, there are short extensions of the upper electrode plate 24 at the side edges of the card to make the connections of the source electrodes of all of the power MOSFETs to the upper electrode plate 24. The terminals for the source electrodes of the power MOSFETs extend through the card, and are soldered to the extensions 161.

The other circuit features shown in the side edge space of the card 20 in FIG. 4 are not intended to be complete or accurate, but do generally indicate that other circuit connections are carried out in these side edge areas of the card, and on both sides of the card. As previously mentioned, the circuitry for the gate controls of the power MOSFETs is contained in these areas.

The connections of the upper electrode plate 24 to the capacitors 28, 30, 32, and 33 are indicated at 163 along the center line of the card 20. Similar connections are made between the other electrodes of capacitors 28, 30, 32, and 33 at the lower plate 26 at the positions indicated at 165. In order to establish a better mechanical connection to the card 20, these terminal connections at 165 are carried through the card and fastened by means of solder on the top side of the card without making electrical contact with the upper electrode plate 24.

FIG. 5 is a simplified schematic circuit diagram of the control circuit 64. The circuitry included in the control circuit 64 is enclosed within a dotted box. The circuit elements providing inputs to the control circuit 64 are shown at the left margin of the drawing, and the output MOSFET switching signal at connection 66 is shown at the right margin of the drawing.

For orientation in FIG. 5, a number of elements from FIG. 1 are again illustrated. These include the key switch 100, the speed control potentiometer 122, and the plug braking diode 124. The input signal at 102 from key switch 100 enables a power supply circuit 160 which, in a preferred embodiment, supplies three different voltages to various parts of the control system.

These voltages are indicated as having the values of +14, +7, and +3. These are nominal values. In the preferred embodiment, +14 is actually +14.4 volts, and +7 is +7.2 volts. In the drawing, a plus sign alone simply indicates a connection to the positive side of the battery 10 of FIG. 1. While the contactor 18 is not shown in FIG. 5, it will be understood that the power supply 160 is not fully activated until the contactor is closed.

The entire control system is adaptable to operation at different voltages. In one preferred embodiment, the control system is capable of operation either at 24 volts or 36 volts. The power supply circuit 160 preferably includes a voltage limiting element such as a zener diode or an integrated circuit regulator which drops and regulates the voltage from the power supply circuit to a maximum of 14.4 volts.

The control circuit 64 includes a pedal integrator circuit 162 which receives the voltage from the pedal potentiometer control 122 on connection 123 and delivers a corresponding voltage at connection 164. The voltage at 164 is delivered to an inverting amplifier 166 which supplies an output on connection 168 to a comparator amplifier 170. Comparator amplifier 170 is also connected at 172 to receive signals from an oscillator 174. Comparison of the voltages from the oscillator at 172 and from the amplifier 166 at 168 determines the duration of the "on" intervals of comparator amplifier 170. The resultant outputs from comparator amplifier 170 at connection 176 are supplied to the gate electrodes of two field effect transistors 178 and 180 which are gated by that output to provide a positive going voltage at connection 66 to turn the power MOSFETs on, and to provide a negative going output at connection 66 to turn the power MOSFETs off.

The operation of the pedal control of the speed through the circuit just described is more fully described as follows:

The circuit responds to the pedal control rheostat 122 so that a higher speed is called for as the voltage of the pedal control rheostat is reduced. This is indicated in the drawing by the arrow 182. Thus, as the voltage at connection 123 goes down, a greater speed is called for. This sense of the signals is carried through the pedal integrator circuit 162 to connection 164, but an inversion takes place at the inverter amplifier 166. The operation of amplifier 166 compares the speed control signal at connection 164 with an enable voltage signal on capacitor 184. The enable signal from capacitor 184 must be at a predetermined level in order for the system to provide an output. The enable voltage signal is subject to various control inputs which are discussed further below.

The output from amplifier 166 at connection 168 is filtered by resistor-capacitor filter 186, 188.

The operation of the comparator amplifier 170 is illustrated by the curves in FIG. 6. The output of the oscillator 174 at 172 is indicated by curve 172A of FIG. 6. Various comparative levels at which the voltage at connection 168 may occur are indicated at 169A, 168B, 168C and 168D. At level 168A, there is no intersection with the oscillator curve 172A. Accordingly, the MOSFETs are not switched on at all, and the motor 12 is not supplied with any current. At level 168B, the MOSFETs are switched on for a brief interval for each cycle of the oscillator as indicated by the area defined by the overlap of the oscillator curve with the voltage level line 168B. Similarly, as the voltage at connection 168 is increased, such as to a level 168C, the MOSFETs are conductive for progressively longer intervals of each cycle. Finally, for voltage levels at 168D and higher, the MOSFETs are on continuously and the maximum current is supplied to the motor 12 and the maximum speed is achieved.

As indicated by the shape of the curve 172A, the oscillator is preferably designed to provide a nonlinear dual slope voltage wave in order to provide a desired nonlinear increase of motor voltage and speed versus changes in control voltage at 168.

The output of comparator amplifier 170 may be said to be inverted since the higher the voltage at 168 goes, the longer the output of comparator amplifier 170 at 176 goes negative. However, the transistor 178 is a p-type field effect transistor which is switched on by a negative going signal to provide positive going switching pulses at the output 66. Conversely, the field effect transistor 180 is an n-type field effect transistor which is switched on by positive going signals to reduce the output voltage at 66 to turn the power MOSFETs off. This voltage reduction occurs because of the connection of the source electrode of transistor 180 to ground through a resistor 190. In similar manner, the positive voltage upon the switching of p-type field effect transistor 178 is achieved by reason of the connection of the source of that transistor to the 14 volt input through resistor 192.

In order to prevent an unwanted energization of the motor 12 as the system is started up, a +14 volt signal is supplied through a resistor 194 to the connection 176 during (and after) initial startup conditions to gate field effect transistor 180 on, and field effect transistor 178 off. The 14 volt signal at resistor 194 is designated as +14B to distinguish it from the normal +14 volt signal from the power supply 160. The +14B signal is available before the +14 signal by virtue of the precharging of the capacitors 28, 30, and 32 of FIG. 1 by resistor 104. The circuitry for providing the +14B signal is not detailed in FIG. 5.

Referring back again to the enable capacitor 184 at the input of amplifier 166, the level of voltage on that capacitor controls the level at which current is controlled through the power MOSFETs. It is one of the important features of the present invention that the MOSFET current is automatically regulated by the control circuit by control of the voltage on capacitor 184. This is accomplished through a comparator amplifier 196 and a connection 198 from an input 200 through diodes 202 and 203. It is a characteristic of power MOSFETs that the drain to source voltage during conduction is a positive function of current. Accordingly, the voltage drop between the drain and source electrodes of the power MOSFETS provides a measure of the current flow through those MOSFETs. The common source connection for all of the power MOSFETs 40–62 corresponds to ground in the control circuit 64. Therefore the signal which is available at input 200, the common drain voltage at the common MOSFET drain heat sink bus 39, is effective to indicate the desired MOSFET current. That signal is compared with a current limit reference voltage from a current limit reference voltage circuit 204 at connection 205 to comparator amplifier 196. The current limit reference voltage circuit 204 provides a reference voltage which determines the maximum amount of current the power MOSFETs are permitted to supply.

While the inverting input 198 of comparator amplifier 196 is connected through resistor 206 to +14 volts, that connection 198 is normally held low when the MOSFETs are off by a current limit disablement circuit including a comparator amplifier 208, resistors 210 and 212, capacitor 214, and a diode 216. Whenever the MOSFET control output 66 is low, diode 216 is conductive, making the noninverting input of comparator amplifier 208 low, and holding connection 198 low so that there is no current limiting action. However, as soon as the power MOSFET control signal at 66 goes up, the diode 216 becomes nonconductive, and after a time interval determined by capacitor 214 and resistor 210, the comparator amplifier 208 is no longer effective to hold the circuit connection 198 down. However, the voltage level at 198 is then determined by the voltage of the now conducting common MOSFET drain 39 at connection 200 as detected through diodes 202 and 203. When the current through the power MOSFETs rises the potential level at connection 200 rises, permitting the potential at connection 198 to rise to cause the voltage output from comparator amplifier 196 to drop and thus reduce the voltage at capacitor 184, and to thus limit the duty cycle of the comparator amplifier 170 to a level which provides that overlimit currents are not permitted to flow in the power MOSFETs. It is important that the current measurement at the MOSFET drain is disabled while the MOSFETs are not conducting because the drain to source voltage is not then a measure of current.

One of the most important aspects of the current control feature is that the current control circuit always controls at the same voltage level as determined by the current limit reference voltage circuit 204. Accordingly, if one of the power MOSFETs 40-62 of FIG. 1 fails, no additional current is carried by the other MOSFETs since the drain to source voltage remains constant. Accordingly, the system simply carries less current, and each power MOSFET carries the same current no matter how many power MOSFETs are connected in parallel and operative. In practice, it has been determined that if one of the power MOSFETs fails, it simply burns out, resulting in an open circuit between the drain and source of that power MOSFET.

As mentioned earlier, the power MOSFETs have a positive temperature-resistance coefficient. In order to make the current limit control feature more accurate, the current limit control circuit is partially compensated for that positive temperature-resistance coefficient of the MOSFETs by the diodes 202 and 203, which have a negative temperature-resistance coefficient.

As mentioned previously, since the voltage must be up on capacitor 184 in order to provide an output from amplifier 166 which is effective to operate the power MOSFETs, the control of the voltage on capacitor 184 can be used for various control purposes other than controlling maximum current flow. For instance, if there is a pedal fault, meaning an open circuit at the connection 123 from the pedal control rheostat 122 to the pedal integrator circuit 162, the resultant lack of a positive voltage on the associated connection 123A causes the output of a comparator amplifier 218 to go down, reducing the voltage at connection 220, and pulling down the voltage on capacitor 184 through diode 222. Thus, under this pedal fault condition, the control circuit 64 will not issue "on" signals to the power MOSFETs from connection 66, and the drive motor will not operate.

The control system 64 also includes a circuit having a comparator amplifier 224 which is connected to detect battery voltage at connection 126 through filtering elements to determine if the battery voltage decreases to a point below which the power supply circuit 160 will not be able to provide reliable operating voltages to the control system. When that occurs, comparator amplifier 224 provides a negative going output which operates through connection 220 and diode 222 to limit the voltage on capacitor 184 and to limit further operation of the system. The limiting operation of comparator amplifier 224 thus causes a reduction in the current duty cycle which prevents the battery voltage from decreasing further. The undervoltage detection circuit, including comparator amplifier 224, may preferably be set to respond to any voltage under about 18 volts for a system which is designed for operation at a minimum nominal battery voltage of 24 volts.

Another problem which could arise in the operation of the system is that the operator might attempt to turn the system on by means of the key switch 100 while the accelerator pedal control 122 is depressed. This could lead to a very sudden start and might result in an accident in the operation of the vehicle. Accordingly, a high pedal disable circuit is provided including a comparator amplifier 228 which is connected to receive a pedal signal from connection 123 through a diode 230. If the pedal setting is high initially as the key switch 100 is turned on, that high speed position, as previously explained, results in a low voltage output from the pedal at connection 123. Such a low voltage will not be sufficient to provide sufficient current through diode 230 to comparator amplifier 228 to bring that amplifier output voltage up to a level which will permit the enable capacitor 184 to charge sufficiently to start the system. If the output of comparator amplifier 228 is low, that low voltage pulls down the voltage of connection 220 through a diode 232. However, if the pedal is in the proper low speed (high voltage) position, then upon initial startup, the voltage goes up on the noninverting input of comparator amplifier 228, and on an associated capacitor 234, switching off the diode 232, and permitting the voltage to build up on the enable capacitor 184.

As previously mentioned above in connection with the description of the circuit of FIG. 1, the control system is operable to detect a reverse torque condition of the motor by reversal of the switch 16 of FIG. 1. That detection is carried out by the detection of a reversal in the voltage across diode 124 at connections 126 and 127. Diode 124 and connections 126 and 127 are illustrated in the lower left hand corner of FIG. 5. That reversal in voltage is detected through intermediate filtering elements at the input of comparator amplifier 236, and the resultant output is carried through a switch 238 to a circuit 240. Circuit 240 is connected to the current limit reference voltage circuit 204 to change the operation of that reference voltage circuit to reduce the amount of current which the power MOSFETs are permitted to carry. This is important because the motor torque must be drastically reduced in this reverse torque connection in order to avoid skidding of the wheels and substantially uncontrolled braking. Also, the frequency of operation of the control system must be drastically reduced. This is carried out by the connection 240 to the oscillator 174 which is operable to control that oscillator to change the frequency of oscillation, reducing the frequency preferably by a ratio of about ten to one.

By way of example, in a preferred embodiment of the invention, during regular operation the current may be limited to 275 amperes. However, during plug braking, if the current exceeds 75 amperes, the motor field is too strong, creating too high a reverse torque, and braking is not in the desired range. However, because of the finite limits on switching speeds for the MOSFETs and diodes, the minimum duty cycle of the system at the regular operating frequency of 15 kilohertz is about ten percent. This still creates too much reverse torque. Accordingly, by reducing the operating frequency by a ratio of about ten to one, it is possible to reduce the miminum duty cycle to about one percent. This is well within the desired range.

Reducing the operating frequency of the system by a ratio of ten to one brings the operating frequency well down into the audible range. However, with the reduced current which is being controlled through the motor field only, the chopper frequency is barely audible in intensity.

If the operator desires to actually reverse the direction of movement of the vehicle, the control system reverts to normal operating mode after the vehicle comes to a stop, and reverses direction. The vehicle is thus no longer in "plug" braking mode. Elsewhere in this specification, reference is made to reversing the torque of the motor. It will be understood that this reverse torque language refers to a reversal of the torque in opposition to the current motion of the vehicle, rather than a reversal of torque from a stopped position in order to operate the vehicle in the opposite direction.

Alternatively, it may be desired to simply prevent the plug braking by turning off the power MOSFETs and allowing the vehicle to coast to a stop if the motor torque is reversed by reversing the field of the motor. If that option is selected, the switch 238 is placed in the other position, providing a negative going signal at connection 242 which operates in the same manner as the high pedal disable circuit of comparator amplifier 228 to pull down the charge of enablement capacitor 184 through diodes 232 and 222.

Another feature of the preferred embodiment of the invention is a high temperature current limit feature. The temperature of the system is monitored by a thermistor 244 shown in the lower right corner of FIG. 5. When an over-temperature condition is reached, the resultant decrease in the resistance of the thermistor 244 provides a signal at connection 246 which switches a comparator amplifier 248. Comparator amplifier 248 then provides a signal at 250 to the current limit reference circuit 204 to change the operation of that reference circuit to reduce the current limit to prevent further overheating. In a 275 ampere system, the current may be limited to 100 amperes.

In a preferred embodiment of the invention which is designed to handle a total rated current of 275 amperes, each of the capacitors 28, 30, 32, and 33 must handle about 50 amperes of ripple current under maximum ripple current conditions. It has been discovered that despite the amplitude of this ripple current, capacitors may be employed which are rated for only 6.8 amperes of ripple current. However, that rating is for 6.8 amperes ripple current in continuous service at 180 degrees F. In the present application, the service is discontinuous, and the temperatures are not as high as 180 degrees.

While this present system is disclosed as employing four MOSFETs 40–62 with each of the diodes 108, 110, 112, a different number of MOSFETs may be used with each diode. For instance, the number of MOSFETs may be cut down to two per diode, particularly as new MOSFET designs having new specifications become available.

While the physical configuration presented in FIGS. 1, 2, 3, and 4 is the preferred physical configuration for the system of the present invention, it is apparent that the components may be arranged in other physical configurations. For instance, instead of two rails on the heat sink, a single rail may be employed, or a square configuration of rails may be employed instead of two parallel rails. Still other configurations will occur to those who are skilled in the art.

The MOSFETs 40–62 are physically capable of controlled cutoff of conduction within 100 nanoseconds. However, the gate control circuits are designed to cut off the MOSFETS at a much slower rate than this, in the order of 500 nanoseconds. The cutoff switching speed is determined by the size of the gate circuit resistance 72–94. One reason for the slower cutoff speed is that a transient voltage spike occurs as the MOSFETs turn off. The faster the turnoff, the greater this transient voltage spike becomes, and the greater the danger that there will be a voltage failure of one or more of the MOSFETs. By controlling the cutoff time at from 500 to 600 nanoseconds, an acceptable transient voltage spike limit is achieved. However, if a faster turnoff is desired, or if an extra measure of safety is desired, a so-called "snubber" circuit may be provided for the MOSFETs in each group associated with each diode. The snubber circuit consists of a zener diode connected in series with another diode between the drain of at least one MOSFET in each group and the gate of that MOSFET. The circuit connections are: from the drain of the MOSFET to the cathode of the zener, from the anode of the zener to the anode of the other diode, and from the cathode of the other diode to the gate of the MOSFET. The zener diode is rated at 47 volts so that if the voltage "spike" from drain to gate exceeds about 50 volts, the gate turns the MOSFET back on to limit the voltage "spike".

One of the most important features of the physical configuration of the invention as illustrated in FIGS. 1–4, is the provision of the massive combined frame and common bus and heat sink 39, which is preferably composed of a highly heat conductive material such as aluminum. This feature assures that all of the power MOSFETs and diodes operate at substantially the same temperature. Under these operating conditions, the power MOSFETs operate well in parallel, sharing the load substantially equally. The invention has been described in relation to battery powered vehicles such as golf carts and baggage trucks. However, the invention is usable in a wide variety of applications including boats, conveyors, and unmanned vehicles.

While this invention has been shown and described in connection with particular preferred embodiments, various alterations modifications will occur to those skilled in the art. Accordingly, the following claims are intended to define the valid scope of this invention over the prior art, and to cover all changes and modifications falling within the true spirit and valid scope of this invention.

I claim:

1. An electronic circuit chopper control system for a d.c. traction motor comprising a plurality of parallel-connected power field effect transistors arranged for connection in series with the traction motor, a common control circuit connected to the gate electrodes of said field effect transistors to control an on-off cycle of conduction through said field effect transistors, a plurality of parallel connected power diodes arranged for reverse connection in parallel with the traction motor to serve as freewheeling diodes, said diodes being physically positioned apart from one another and distributed in position among said field effect transistors and each diode being positioned in a similar manner with a group of associated field effect transistors for ease of transfer of current flow between the diode and the associated field effect transistors.

2. A control system as claimed in claim 1 including a capacitance structure arranged for connection across a d.c. power source and having a total capacitance which is sufficient to handle a total ripple current corresponding to a substantial fraction of the average current flow through the system at the chopper operating frequency with a negligible change in capacitor voltage so as to provide, in combination with the d.c. power source, an apparent d.c. power source having a negligible series impedence.

3. A control system as claimed in claim 2 including a printed circuit board, said capacitance structure including two plate electrodes on opposite sides of said printed circuit board and covering substantial areas of said printed circuit board, said plate electrodes being substantially coextensive in area, said plate electrodes each including short printed extensions from the edges thereof for connections from one of said electrodes to said diodes and for connections from the other one of said electrodes to said field effect transistors.

4. A control system as claimed in claim 3 wherein said capacitance structure includes a plurality of high capacitance and low resistance and low inductance capacitors connected in parallel across said plate electrodes.

5. A control system as claimed in claim 4 wherein said capacitors are distributed in position with respect to said plate electrodes.

6. A control system as claimed in claim 3 wherein each of said field effect transistors includes a housing electrically connected to one field effect transistor load conducting terminal, a common heat sink support structure mechanically and electrically connected in common to the housings of all of said power field effect transistors, said heat sink support structure comprising a common electrical connection between the terminals of said power field effect transistors connected to the field effect transistor housings, one terminal of each of said diodes being connected to the housing of that diode, and the housing of each diode being physically and electrically connected to said heat sink structure.

7. A control system as claimed in claim 6 wherein said common heat sink support structure comprises a base plate of heat conductive metal, said base plate including at least two upwardly extending rails terminating in upper edges, said housings of said field effect transistors and said housings of said diodes being connected to at least one of said rails at said upper edges thereof.

8. A control system as claimed in claim 7 wherein said printed circuit board is physically supported upon and connected to the remainder of said control system by electrical and mechanical connections to the gate electrodes of said field effect transistors and by electrical and mechanical connections to the other load conducting terminal of each of said field effect transistors and by electrical and mechanical connections to the other electrodes of said freewheeling diodes.

9. A control system as claimed in claim 1 wherein said system includes an oscillator circuit for determining the chopper frequency, plug braking detection circuit means for determining when plug braking is initiated by reversal of motor connections, and frequency switching circuit means connected for response to said plug braking detection circuit means and connected to said oscillator circuit for substantially reducing the frequency of operation of said oscillator circuit during plug braking.

10. A control system as claimed in claim 1 which is arranged to be connected to an adjustable speed control device which is operable to issue a low voltage when high speed is called for and a high voltage when low speed is called for, said control system including an open circuit fault detection means for determining when there is an open circuit fault in the connection from the adjustable speed control device to said control system, said open circuit fault detection means being connected and operable to disable the remainder of said control system to prevent energization of the traction motor in the presence of a fault condition.

11. A control system as claimed in claim 1 wherein there is provided a circuit means for monitoring the voltage of a d.c. power source connected to said control system, said voltage monitoring circuit means being operable to limit the duty cycle as determined by said control system when the d.c. power source voltage drops to a predetermined minimum level to thereby assure that unreliable operation of said control system because of a low voltage condition is avoided.

12. A control system as claimed in claim 1 which is arranged to be connected to an adjustable speed control device which is operable to issue a voltage which varies according to the adjustment thereof and wherein there is provided a voltage comparator circuit and a voltage reference circuit connected to provide a voltage reference to said voltage comparator circuit, circuit means connected and arranged to convey a voltage derived from said adjustable speed control device to said comparator circuit to determine a controlled speed based upon a voltage difference between said voltage reference circuit voltage and said speed control device voltage derived from said comparator circuit, a high speed control disablement circuit connected to detect the voltage from said adjustable speed control device, a connection from the output of said high speed control disablement circuit to said voltage reference circuit, said disablement circuit being operable upon detection of an initial high speed setting upon startup of the control system to disable said voltage reference circuit to thereby disable said control system to prevent initial energization of the traction motor until the adjustable speed control device is adjusted to a low speed setting.

13. A control system as claimed in claim 1 which is arranged to be connected to an adjustable speed control device which is operable to issuue a voltage which varies according to the adjustment thereof and wherein there is further provided a voltage comparator circuit and a voltage reference circuit connected to provide a voltage reference to said voltage comparator circuit, circuit means connected and arranged to convey a voltage derived from adjustable speed control device to said comparator circuit to determine a controlled speed based upon a voltage difference between said voltage reference circuit voltage and said speed control device voltage derived from said comparator circuit, a reverse motor field detection circuit connected to detect a reversal of the motor field connections prior to stopping the traction motor, a connection from said reverse motor field detection circuit to said voltage reference circuit, said reverse motor field detection circuit being operable through said last-named connection upon the detection of a reverse motor field to disable said voltage reference circuit to thereby disable said control system to prevent further energization of the traction motor with the reversed field until the traction motor and the associated vehicle come to a substantial stop.

14. A control system as claimed in claim 1 which is arranged to be connected to an adjustable speed control device which is operable to issue a voltage which varies according to the adjustment thereof and wherein there is provided a voltage comparator circuit and a voltage reference circuit connected to provide a voltage reference to said voltage comparator circuit, circuit means connected and arranged to convey a voltage derived from said adjustable speed control device to said comparator circuit to determine a controlled speed based upon a voltage difference between said voltage reference circuit voltage and said speed control device voltage derived from said comparator circuit, said voltage reference circuit including a current limit reference voltage circuit for generating a voltage corresponding to a desired current limit, said voltage reference circuit also including circuit means for detecting the drain to source voltage of said power MOSFETs as a basis for determining the current conducted by said power MOSFETs during conductive intervals thereof, said voltage reference circuit including means for comparing the voltage from said current limit reference voltage circuit and the voltage from the drain to source of said MOSFETs as a basis for limiting said reference voltage from said voltage reference circuit to a value corresponding to the desired maximum current.

15. A system as claimed in claim 1 wherein said diodes are small, fast reverse voltage recovery diodes.

16. A control system as claimed in claim 7 wherein said capacitance structure includes a plurality of high capacitance and low resistance and low inductance capacitors connected in parallel across said plate electrodes, said capacitors being attached to and supported upon said printed circuit board and being physically positioned between said upwardly extending rails of said heat sink support structure.

17. A system as claimed in claim 14 wherein said circuit means for detecting the drain to source voltage of said power MOSFETs as a basis for determining the current conducted by said power MOSFETs during conductive intervals thereof includes a further circuit means for disabling detection of the drain to source voltage of said power MOSFETs during nonconductive intervals of said power MOSFETs.

18. A system as claimed in claim 14 wherein there is further provided a high temperature current limit circuit comprising a temperature-sensitive signal device for detecting the presence of a high temperature, and means for connecting said high temperature signal from said temperature sensitive signal device to said current limit reference voltage circuit to modify the operation of said current limit reference voltage circuit to call for a lower maximum current during high temperature operating conditions.

* * * * *

UNITED STATES PATENT AND TRADEMARK OFFICE
CERTIFICATE OF CORRECTION

PATENT NO. : 4,626,750
DATED : Dec. 2, 1986
INVENTOR(S) : Stephen F. Post

It is certified that error appears in the above-identified patent and that said Letters Patent are hereby corrected as shown below:

| | | |
|---|---|---|
| Column 6, | line 46, | "connected to" should read --connected in--. |
| Column 7, | line 41, | "a outer" should read --an outer--. |
| Column 9, | line 60 | "at 169A" should read --at 168A--. |
| Column 14, | line 57, | "alterations modifications" should read --alterations and modifications--. |
| Column 16, | line 62, | "from adjustable" should read --from said adjustable--. |

Signed and Sealed this

Eleventh Day of August, 1987

*Attest:*

DONALD J. QUIGG

*Attesting Officer*  *Commissioner of Patents and Trademarks*